C. C. HAYES.
VEHICLE SPRING.
APPLICATION FILED FEB. 11, 1909.
927,797.
Patented July 13, 1909.
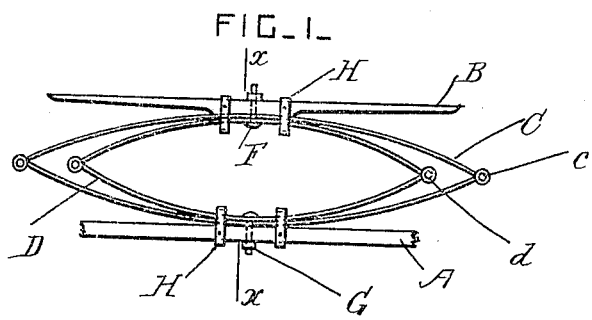
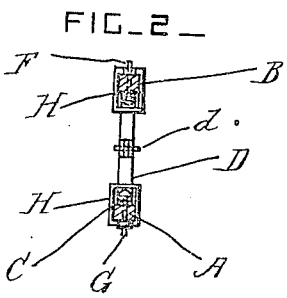
WITNESSES
W. E. Allen
W. Allen
INVENTOR
Charles C. Hayes.
by Herbert W. J. Jenner.
Attorney

UNITED STATES PATENT OFFICE.

CHARLES C. HAYES, OF NEW YORK, N. Y.

VEHICLE-SPRING.

No. 927,797.  Specification of Letters Patent.  Patented July 13, 1909.

Application filed February 11, 1909. Serial No. 477,408.

*To all whom it may concern:*

Be it known that I, CHARLES C. HAYES, a citizen of the United States, residing at New York city, in the State of New York, have invented certain new and useful Improvements in Vehicle-Springs; and I do hereby declare the following to be a full, clear, and exact description of the invention, such as will enable others skilled in the art to which it appertains to make and use the same.

This invention relates to elliptical springs used in connection with vehicles; and it consists in the novel construction and combination of the parts hereinafter fully described and claimed.

In the drawings, Figure 1 is a front view of the springs and portions of a vehicle. Fig. 2 is a cross-section, taken on the line $x$—$x$ in Fig. 1.

A is a portion of a vehicle axle, and B is a portion of the bar secured to the vehicle body and to which the springs are attached. The outer or main spring C consists of two curved leaf-springs having their ends provided with hinge joints and connected together by pins $c$.

The inner or auxiliary spring D consists of two curved leaf-springs, similar to the leaf-springs C, but shorter and of greater curvature. The leaf-springs D have hinge joints at their ends, and they are connected together by pivot pins $d$. Each leaf-spring may consist of a single leaf, or a plurality of leaves may be used.

The middle parts of the outer spring C are seated against the axle A and the bar B; and the middle parts of the inner spring D are seated against the middle parts of the outer spring.

F is a bolt at the middle of the springs which connects them together and to the bar B.

G is a bolt at the middle of the springs which connects them together and to the axle A.

H are guide-clips which prevent the springs from revolving on the bolts F and G. These guide-clips are formed in any approved manner, and they are secured to the bar B and the axle A so that they cannot slip. These guide-clips inclose portions of the springs, but they do not prevent the leaves of the springs from sliding freely in a vertical direction in contact with each other.

The pivot pins which couple together the ends of the leaf-springs permit them to have great freedom of movement, and it is found that when the outer spring is reinforced by an inner elliptical spring having the ends of its leaves coupled together by pivot pins, both springs move up and down under the load in a very efficient manner, and that an undesirable proportion of the load is never thrown upon one spring or the other in any position of the load.

What I claim is:

The combination, with an axle, and a body bar; of two springs of unequal length arranged one inside the other, each spring comprising two leaf springs having their ends pivoted together, fastening devices which secure the middle portions of the said springs together and to the said axle and bar respectively, and guides secured to the said axle and bar and not secured to the said springs, said guides being arranged to straddle the leaves of the said springs and to permit them to oscillate freely in a vertical plane.

In testimony whereof I have affixed my signature in the presence of two witnesses.

CHARLES C. HAYES.

Witnesses:
  GEO. A. GRIFFIN,
  JAS. A. ROONEY.